United States Patent
Holub-Górny et al.

(10) Patent No.: US 7,376,145 B2
(45) Date of Patent: May 20, 2008

(54) DEVICE FOR CONTROLLING DECODER EXTENSION CARDS AND UNIVERSAL EXTENSION CARDS

(75) Inventors: Marek Holub-Górny, Zielona Góra (PL); Tomasz Hanzlik, Wroclaw (PL); Marcin Stabrowski, Zielona Góra (PL)

(73) Assignee: Advanced Digital Broadcast, Ltd., Taipei (TW)

( * ) Notice: Subject to any disclaimer, the term of this patent is extended or adjusted under 35 U.S.C. 154(b) by 967 days.

(21) Appl. No.: 10/748,408

(22) Filed: Dec. 29, 2003

(65) Prior Publication Data

US 2004/0141520 A1    Jul. 22, 2004

(30) Foreign Application Priority Data

Dec. 30, 2002    (PL) ..................................... 358050

(51) Int. Cl.
*H04L 12/66* (2006.01)

(52) U.S. Cl. ...................... 370/463; 370/537

(58) Field of Classification Search ............. 370/463, 370/537, 381, 378, 368, 419; 710/101–102
See application file for complete search history.

(56) References Cited

U.S. PATENT DOCUMENTS

| 5,519,839 | A | * | 5/1996 | Culley et al. ................. 710/52 |
| 5,768,615 | A |   | 6/1998 | Castell et al. |
| 5,793,989 | A |   | 8/1998 | Moss et al. |
| 6,209,050 | B1 | * | 3/2001 | Iho et al. ..................... 710/301 |

* cited by examiner

*Primary Examiner*—Brenda Pham
(74) *Attorney, Agent, or Firm*—Matthias Scholl, PC

(57) ABSTRACT

A device for controlling decoder extension cards and universal extension cards, comprising a card reader, control circuit and a processor, characterized in that the receiver (1) is connected via the control circuit (2) with the processor (2), select circuit (4) and a card reader (9) connected with a power supply circuit (8), and to the card reader (9) three buffers are connected, where the card reader (9) is connected via the first buffer (5) and the second buffer (6) with the processor, and via the third buffer (7) with the control circuit (2).

4 Claims, 4 Drawing Sheets

DEVICE FOR CONTROLLING DECODER EXTENSION CARDS AND UNIVERSAL EXTENSION CARDS

CROSS REFERENCE TO RELATED APPLICATIONS

The subject application claims priority to Polish patent application No. P-358050, filed Dec. 30, 2002.

FIELD OF THE INVENTION

The field of the invention relates to extension cards for electronic devices, and more particularly for controlling multiple types of extension cards using a common control circuit.

BACKGROUND

The known devices for controlling decoder extension cards (CI type cards—Common Interface Specification for Conditional Access and other Digital Video Broadcasting Decoder Application) or universal extension cards (cards of PCMCIA—Personal Computer Memory Card International Association) are equipped with a card reader having a slot (pocket), which is linked to the processor and the control circuit.

SUMMARY OF THE INVENTION

An object of the invention is a device for handling decoder extension cards and universal extension cards, which enables the device to simultaneously service decoder extension cards and universal extension cards.

An aspect of the device for controlling decoder extension cards and universal extension cards, according to an embodiment of the invention, is a receiver, which by means of the control circuit is linked with the processor, with a select circuit with a card reader, and with a power supply circuit. Three buffers are coupled to the card reader, while the card reader, via the first buffer and the second buffer is linked with the processor and via the third buffer is linked with the control circuit.

It is preferable that the select circuit incorporates four inputs, out of which the input for one control signal is linked to an input of a multiplexer, while each of the remaining three inputs for the other control signals is linked to the input of one of three inverters, while the outputs of the inverters are linked to NAND elements, the outputs of which NAND elements are linked to the other input of the multiplexer and the inputs of another multiplexer, both multiplexers controlled by a signal generated by the processor.

An aspect of the device, according to a second embodiment of the invention, lies in a first card reader with a power supply circuit and a second card reader with a second power supply circuit and a processor, which is connected via a control bus and 8-bit data bus with the control circuit, the input of which is connected with the receiver. The processor is linked with the first select circuit and with the second select circuit and, via the first buffer for the first card reader and the second buffer for the first card reader, with the first card reader. The processor is linked with the second card reader via the first buffer for the second card reader and the second buffer for the second card reader. The control circuit, via the third buffer for the first card reader, is linked with the first card reader, and via the third buffer for the second card reader is linked with the second card reader.

The device for controlling decoder extension cards and universal extension cards, according to embodiments of the invention, ensures simultaneous processing of television signals, through the use of decoder extension cards, and controlling of universal extension cards.

DETAILED DESCRIPTION OF THE INVENTION

Figure 1:
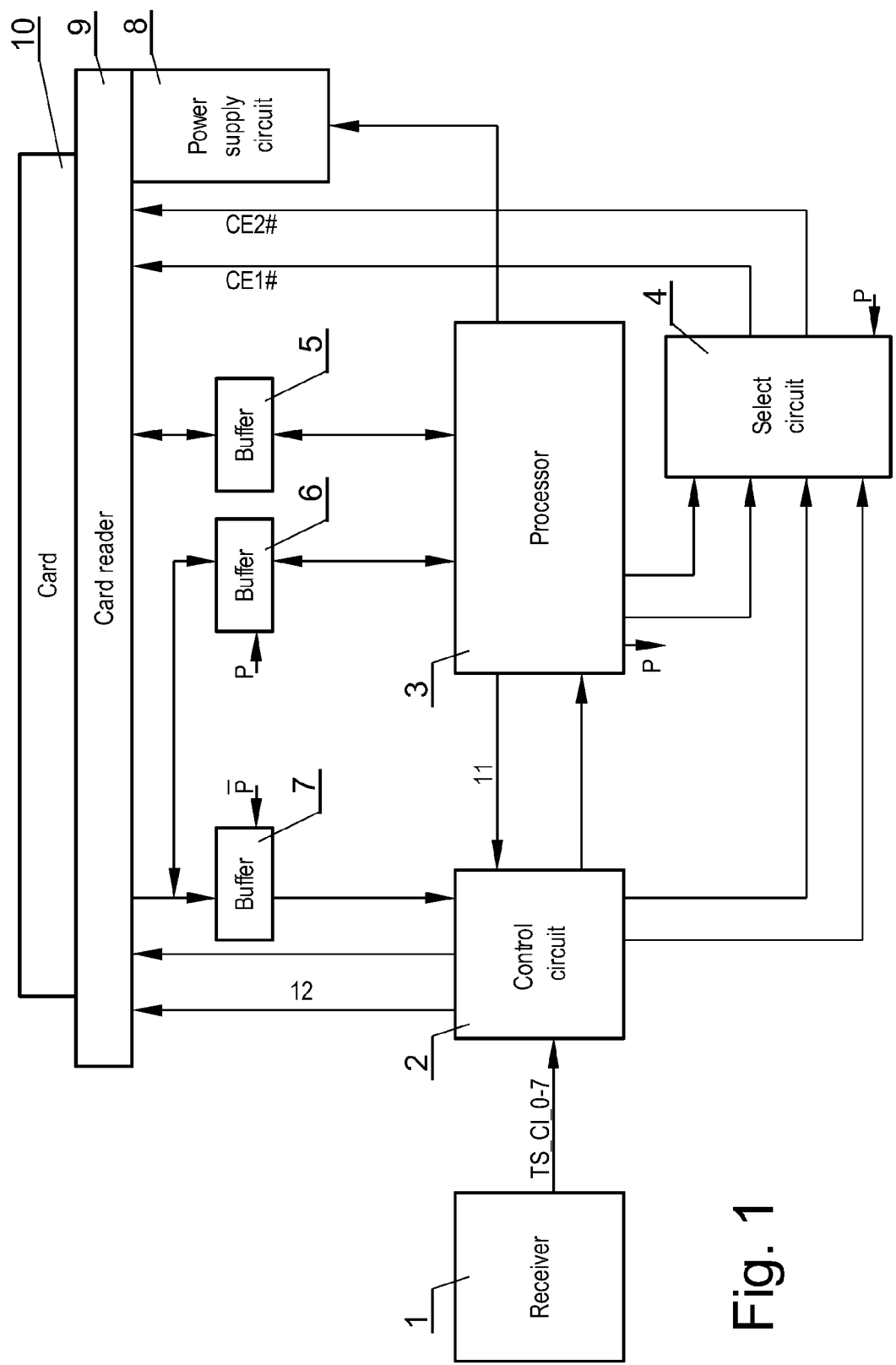
FIG. 1 shows a block diagram of the device for controlling decoder extension cards and universal extension cards with one card reader.

As shown in FIG. 1, according to the first embodiment of the invention, a device for controlling decoder extension cards and universal extension cards with one card reader, is characterized in that the receiver 1 for the scrambled digital television signal is linked via the control circuit 2 with the processor 3, with the select circuit 4 and with the card reader 9, which is linked to the power supply circuit 8. Three buffers 5, 6, 7 are linked with the card reader 9, while the card reader 9, via the first buffer 5 and the second buffer 6 is linked with the processor 3, whereas via the third buffer 7 the card reader 9 is linked with the control circuit 2. The first buffer 5 and the second buffer 6 are bidirectional line transmitter/receivers, while the third buffer 7 is a unidirectional line transmitter/receiver.

In operation, receiver 1 receives a scrambled digital television signal. From receiver 1, via an 8-bit data bus TS_CI_0-7, the signal is transmitted to the control circuit 2. The control circuit 2 controls data transfer between the receiver 1, the processor 3, the select circuit 4 and the card reader 9. Signal P, generated by the processor 3, takes the logical value 0 if the card reader 9 contains a decoder extension card and logical value 1 if the card reader 9 contains a universal extension card. The following are controlled by signal P: select circuit 4, the second buffer 6 and the third buffer 7. Moreover signal P impacts the value of control signals CE1# and CE2#, which are used to read data from the card 10, placed in the card reader 9.

Figure 2:
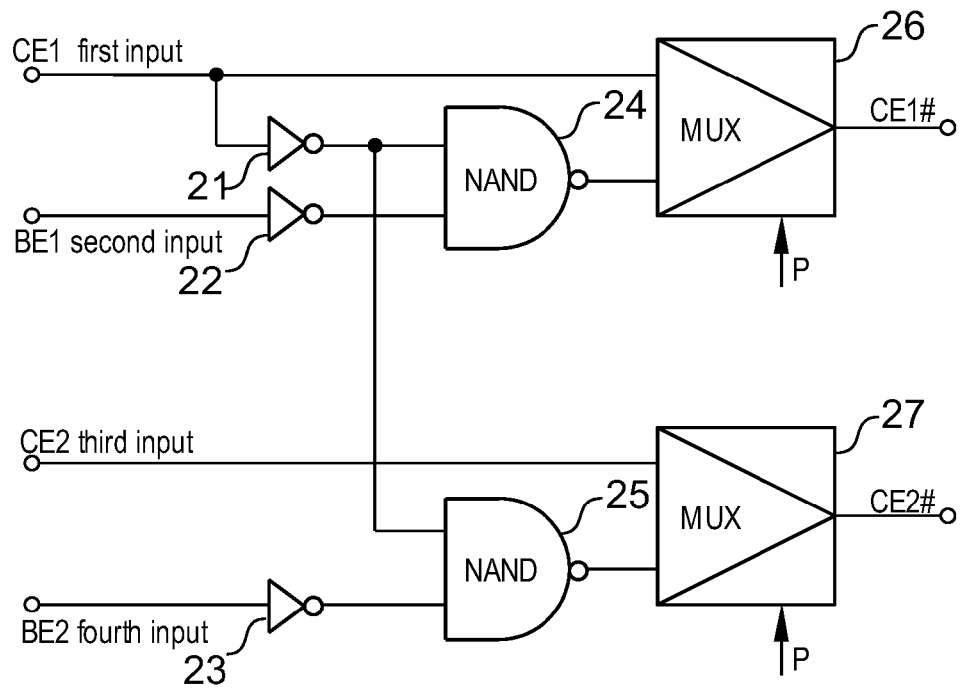
FIG. 2 shows a block diagram of the select circuit.

In FIG. 2, the select circuit 4 is disclosed in more detail. The select circuit 4 includes four inputs, namely a first input CE1, a second BE1, a third CE2 and a fourth BE2. The first and second inputs CE1 and BE1 receive data from the processor 3. The third and fourth inputs CE2 and BE2 receive data from the control circuit 2. The first input CE1 is connected to an input of the first multiplexer 26, and to the first inverter 21. The second input BE1 is connected to the first inverter 21. The third input CE2 is connected to an input of the second multiplexer 27. The fourth input BE2 is connected to the third inverter 23. The output of the first inverter 21 is connected to an input of the first NAND element 24, and an input of the second NAND element 25. The output of the second inverter 22 is connected to the other input of the first NAND element 24. The output of the third inverter is connected to the other input of the second NAND element 25. The output of the first NAND element 24 is connected to the other input of the first multiplexer 26. The output of the second NAND element 25 is connected to the other input of the second multiplexer 27. The first and second multiplexers 26, 27 are each controlled by a signal P, from the processor 3.

Figure 3:
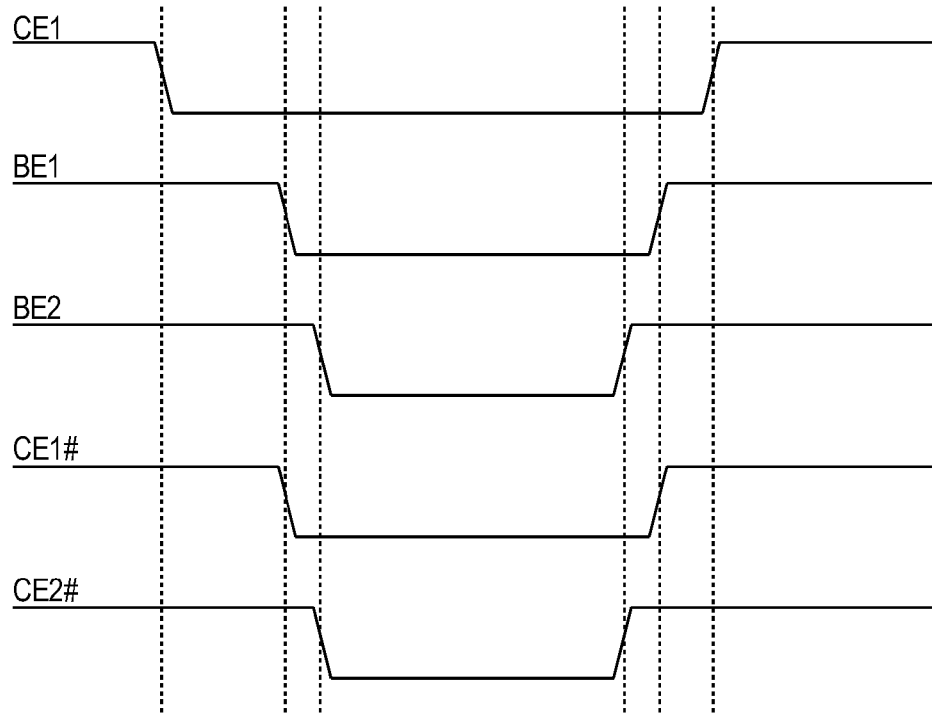
FIG. 3 shows waveforms of impulses on inputs and outputs of the select circuit.

In FIG. 3, a waveform of impulses on the inputs and outputs of the select circuit 4 is shown. When the control signal CE1 goes low and the control signal BE1 goes low, then the output signal CE1# is driven low. When the control signal BE2 goes low along with the control signal CE1 being low, then the output signal CE2# is driven low. Similarly, when the control signal BE2 goes back high, the output signal CE2# is driven high, and when the control signal BE1 goes back high, the output signal CE1# is driven high.

Figure 4:
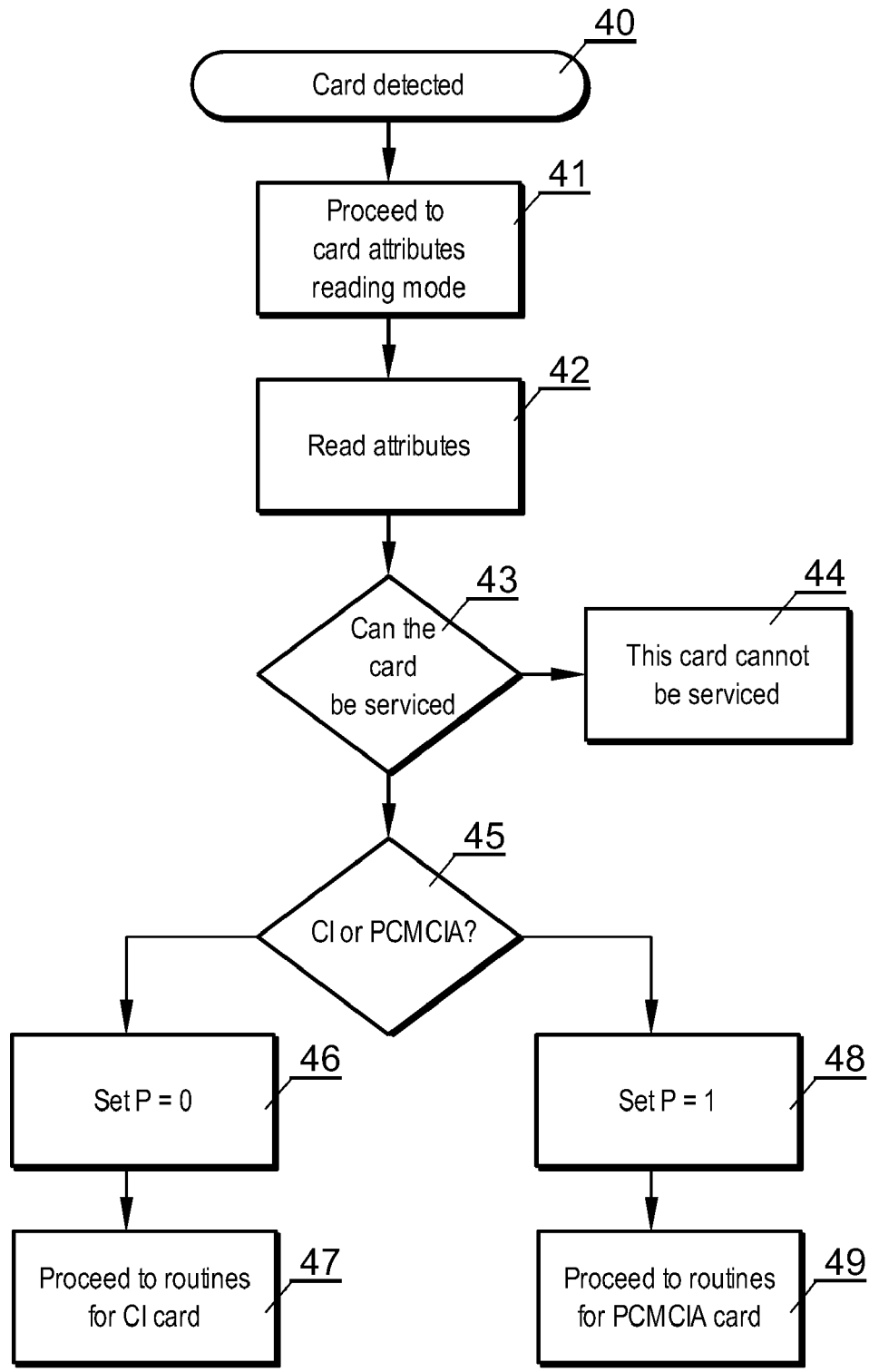
FIG. 4 shows a flowchart of actions for the device for controlling decoder extension cards and universal extension cards with one card reader as illustrated in FIG. 1.

In FIG. 4, a flowchart of a method for operating a device for controlling both decoder extension cards and universal extension cards with one card reader is shown. The method begins at step 40, where a card is detected in the card reader. Then at step 41, the device proceeds to a card attributes reading mode, for determining the type of card present in the card reader. At step 42, the device reads the attributes of the card present in the card reader. At step 43, the device checks whether the card in the card reader is of a type the device can service. If the card cannot be serviced, then at step 44 an error is generated. If the card can be serviced, then at step 45, a check is made to determine whether the card is a CI card or a PCMCIA card. If the card is a CI card, then at step 46, the processor in the device sets the control signal P equal to 0. The method then proceeds on to any other routines defined for servicing the CI card. If the card is a PCMCIA card, then at step 48 the processor in the device sets the control signal P equal to 1. The method then proceeds on to any other routines defined for servicing the PCMCIA card.

Figure 5:
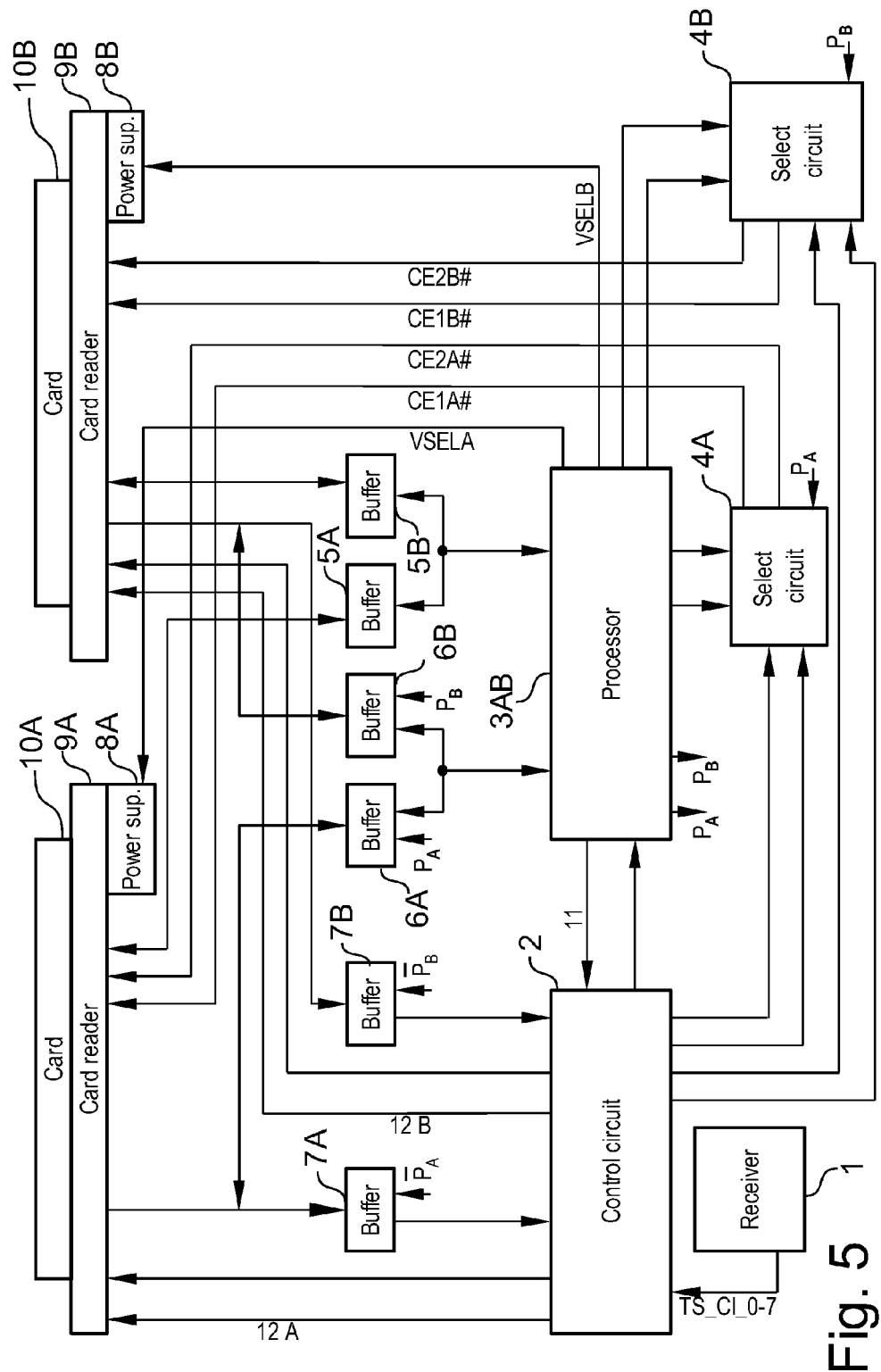
FIG. 5 shows a block diagram of the device for controlling decoder extension cards and universal extension cards with two card readers.

In FIG. 5, according to the second embodiment of the invention, a device for controlling decoder extension cards and universal extension cards includes a first card reader 9A, with a first power supply circuit 8A, and a second card reader 9B, with a second power supply circuit 8B. The device also includes a processor 3AB, which is connected via control bus 11 with control circuit 2, the input of which is linked via 8-bit data bus TS_CI_0-7 to the receiver 1. The processor 3AB is linked with the first select circuit 4A controlled by the signal $P_A$ and with the second select circuit 4B controlled by the signal $P_B$. The processor 3AB is linked with the first card reader 9A via the first buffer for the first card reader 5A and the second buffer for the first card reader 6A, and with the second card reader 9B via the first buffer for the second card reader 5B and the second buffer for the second card reader 6B. The control circuit 2, via the third buffer for the first card reader 7A, is linked with the first card reader 9A, and via the third buffer for the second card reader 7B, it is linked with the second card reader 9B.

Although the device for controlling decoder extension cards and universal extension cards was depicted in relation to two slots (pockets), it is also suitable to extend the capabilities of digital television receivers by means of equipping them with more than two slots (two pockets).

The above given detailed descriptions of the separate functional structures of the device for controlling decoder extension cards and universal extension card, according to embodiments of the invention, should not be interpreted as limiting the idea of the invention to the disclosed embodiments of the described devices, and for an expert in the field of reception of coded television signals it is obvious that the described embodiments of the devices can be subjected to many modifications, adjustments or alternate embodiments, which will not be too far from their technical character and will not lead to diminishing the technical effects, achieved by them. Thus the above description of the invention should not be interpreted as limited to revealing the examples of embodiments and the invention is to be limited only by the patent claims.

What is claimed is:

1. A device for controlling decoder extension cards and universal extension cards, comprising a receiver, a card reader, a control circuit, a processor, and a select circuit, characterized in that the receiver is connected, via the control circuit, with the processor, the select circuit and the card reader connected with a power supply circuit, and a first buffer, a second buffer and a third buffer are connected to the card reader, wherein the card reader is connected via the first buffer and the second buffer with the processor, and via the third buffer with the control circuit.

2. A device according to claim 1, characterized in that, the select circuit comprises a first input, a second input, a third input and a fourth input, a first multiplexer, a second multiplexer, a first inverter, a second inverter, a third inverter, a first NAND element and a second NAND element, wherein each of the first and third inputs of the control signal is connected with an input of one of the first and second multiplexers, while each of the first, second and fourth inputs of control signals is linked with an input of one of the first, second and third inverters, while an output of each of the first, second and third inverters is linked with one of the first and second NAND elements, and an output of each of the first and second NAND elements is linked to an input of one of the first and second multiplexers, and the first and second multiplexers are controlled by a signal generated by the processor.

3. A device for controlling decoder extension cards and universal extension cards incorporating a control circuit and a processor, characterized in that the device comprises a first card reader with a first power supply circuit, a second card reader with a second power supply circuit, a processor which is linked with the control circuit, wherein the input of the control circuit is linked to a receiver, wherein the processor is connected with a first select circuit controlled by a first signal and with a second select circuit controlled by a second signal, and the processor is connected with the first card reader via a first buffer for the first card reader, and a second buffer for the first card reader, and the processor is connected with the second card reader via a first buffer for the second card reader, and a second buffer for the second card reader, and wherein the control circuit is linked with the first card reader via a third buffer for the first card reader, and is linked with the second card reader via a third buffer for the second card reader.

4. A device, according to claim 3, characterized in that, each of the first and second select circuits comprise a first input, a second input, a third input and a fourth input, a first multiplexer, a second multiplexer, a first inverter, a second inverter, a third inverter, a first NAND element and a second NAND element, wherein each of the first and third inputs of control signals are connected with an input of one of the first and second multiplexers, while each of the first, second and fourth inputs of control signals is linked with an input of one of the first, second and third inverters, and an output of each of the first, second and third inverters is linked with one of the first and second NAND elements, and an output of each of the first and second NAND elements is linked to an input of one of the first and second multiplexers, and the first and second multiplexers are controlled by signals generated by the processor.

* * * * *